Nov. 17, 1931.    A. L. WEIS    1,832,675
AUTOMOBILE SIGNALING APPARATUS
Filed June 29, 1929    3 Sheets-Sheet 1

Inventor
Andrew L. Weis
By Arthur F. Durand
Atty.

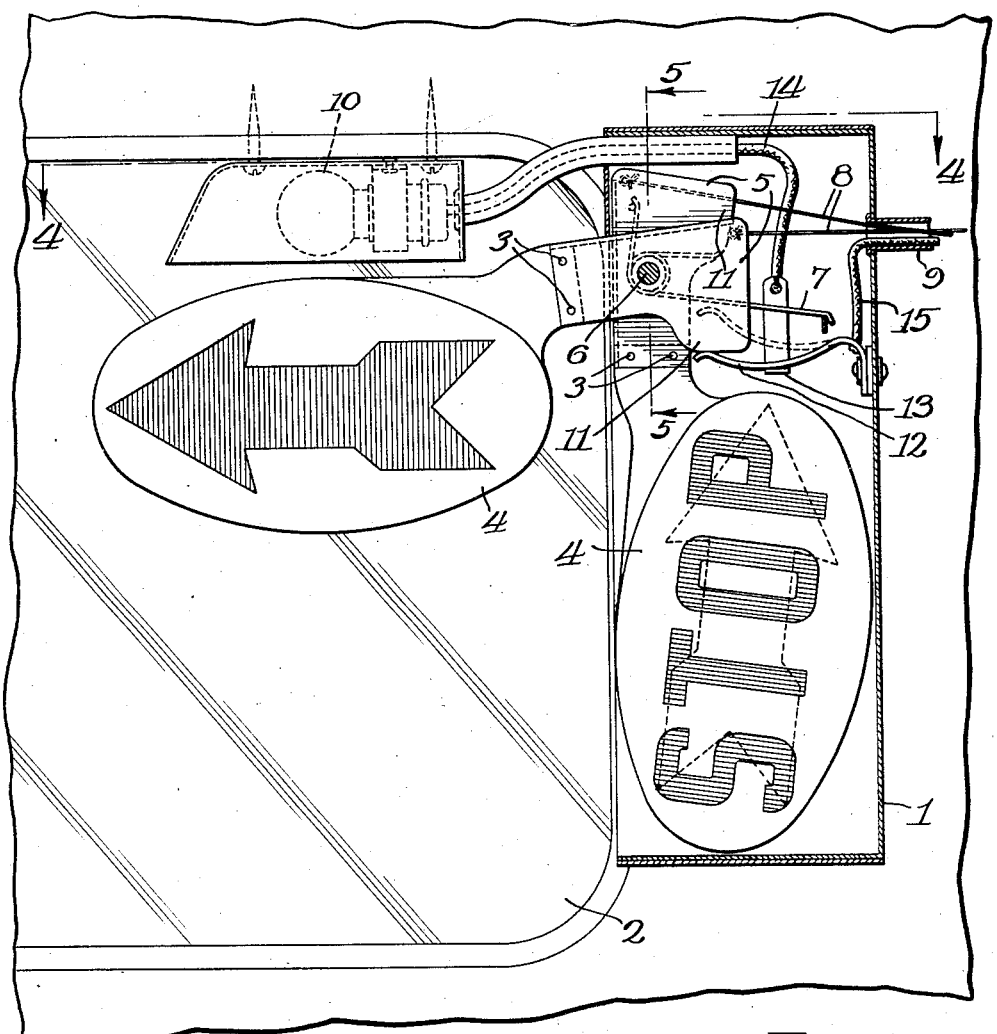

Nov. 17, 1931.  A. L. WEIS  1,832,675
AUTOMOBILE SIGNALING APPARATUS
Filed June 29, 1929   3 Sheets-Sheet 3
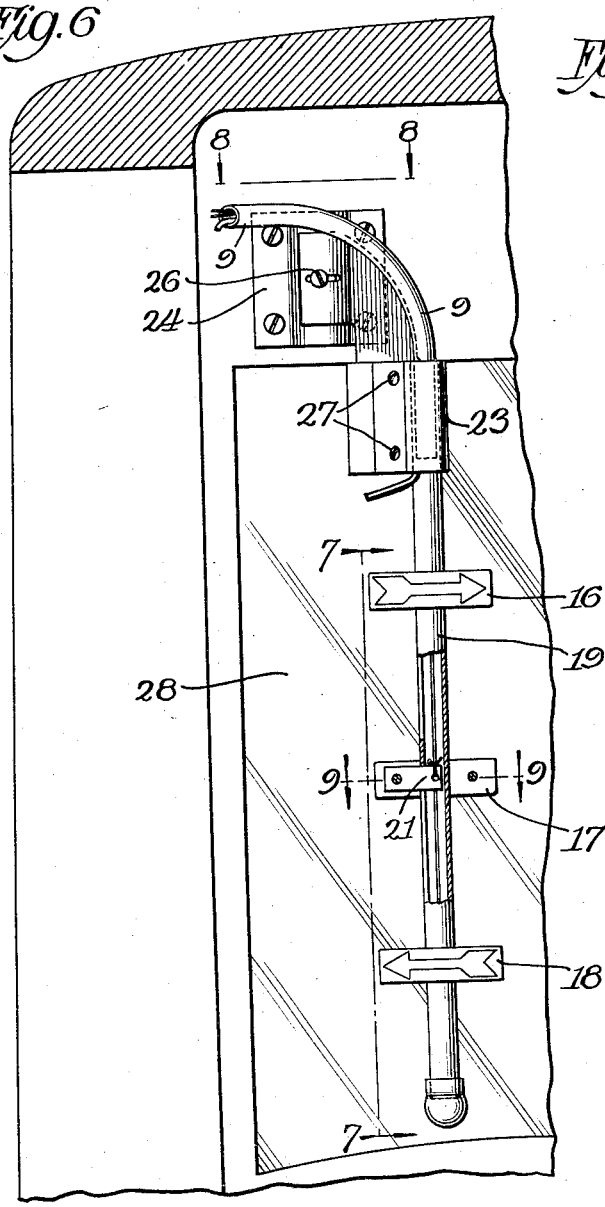
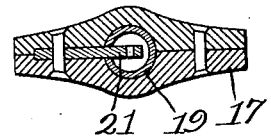
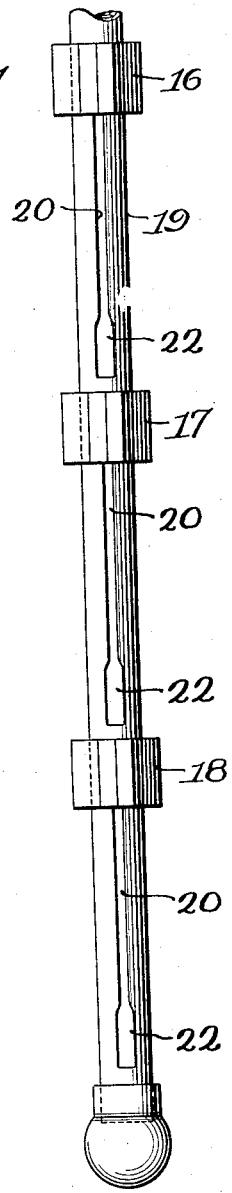
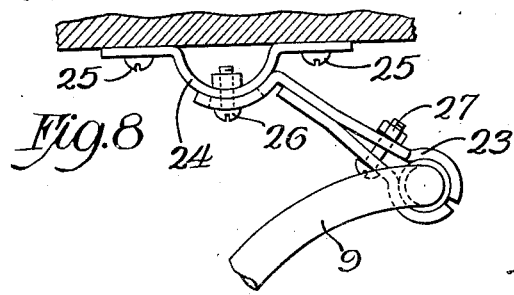
Inventor
Andrew L. Weis
By Arthur F. Durand
Atty.

Patented Nov. 17, 1931

1,832,675

UNITED STATES PATENT OFFICE

ANDREW L. WEIS, OF FORT LAUDERDALE, FLORIDA

AUTOMOBILE SIGNALING APPARATUS

Application filed June 29, 1929. Serial No. 374,888.

This application is subordinate to prior application Serial No. 364,352, now Patent No. 1,772,375, granted August 5, 1930, and is prior to and dominates Patent No. 1,772,376, granted to me August 5, 1930.

This invention relates to automobile or motor vehicle indicators, and more especially those for indicating the direction in which the motor vehicle is going to turn, either to the right or the left.

In addition, the invention relates to signals of this kind which are also adapted to indicate that the vehicle is going to stop.

Generally stated, the object of the invention is to provide a novel and improved signal of this general character, located at the rear of the vehicle body, so that the signal will be displayed at the rear of the car, but at the same time will be under the control of the driver, whereby the intention of the latter regarding the movements of the vehicle will be indicated to the drivers of cars in the rear.

Another object is to provide a rear signal of this kind which is enclosed in the body of the car, so that the signal will be displayed through the rear window of the motor vehicle.

It is also an object to provide certain details and features of construction and combinations tending to increase the general efficiency and the desirability of a motor vehicle signaling apparatus of this particular character.

To the foregoing and other useful ends, the invention consists in the matters hereinafter set forth and claimed, and shown in the accompanying drawings, in which—

Fig. 3 is an enlarged inside elevation of the rear signal of said vehicle, showing certain portions of the construction in vertical section, for convenience of illustration.

Fig. 4 is a horizontal section on line 4—4 in Fig. 3.

Fig. 6 is an enlarged inside elevation of the front or forward controlling means for said signaling device, showing certain portions in vertical section, for convenience of illustration.

Fig. 7 is an enlarged side elevation of a portion of the construction shown in Fig. 6, on line 7—7 in Fig. 6.

Fig. 8 is an enlarged detail horizontal section on line 8—8 in Fig. 6.

Fig. 9 is an enlarged detail horizontal section on line 9—9 in Fig. 6.

Figure 1:
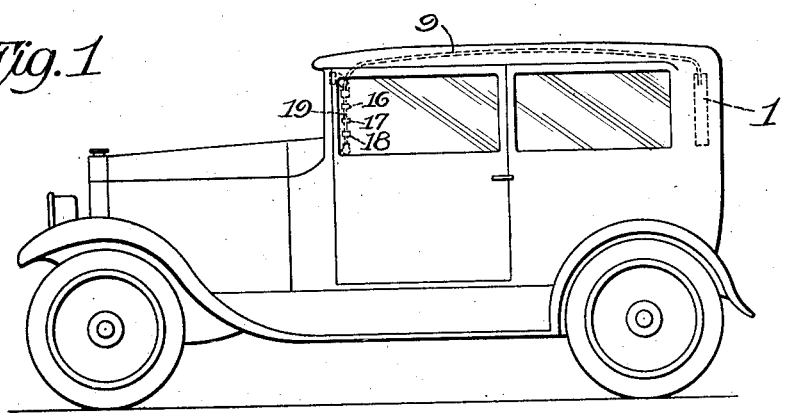
Fig. 1 is a side elevation of a motor vehicle equipped with signaling apparatus embodying the principles of the invention.
Figure 5:
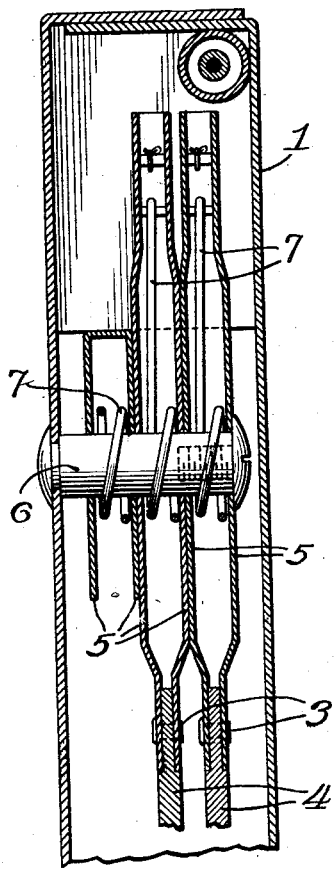
Fig. 5 is an enlarged detail vertical section on line 5—5 in Fig. 3.
Figure 2:
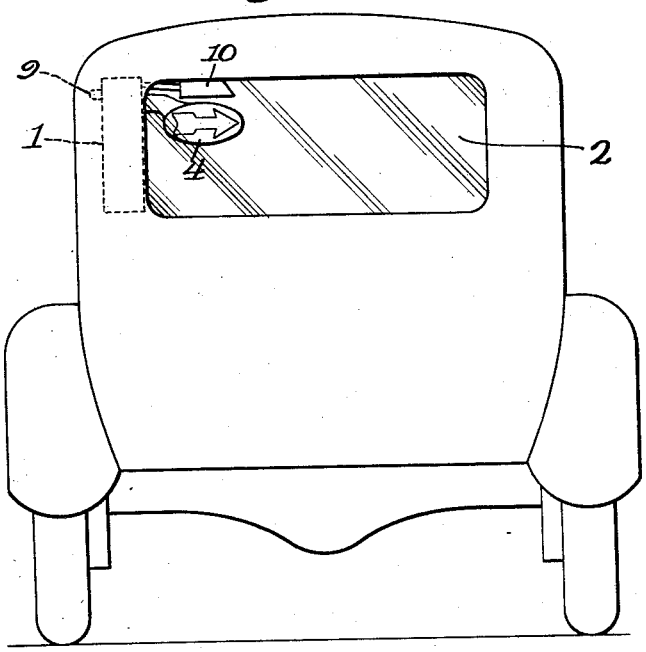
Fig. 2 is an enlarged rear elevation of the said motor vehicle.

As thus illustrated, the signaling devices to be displayed to motor vehicles traveling in rear of the motor vehicle shown in the drawings, include a sheet-metal casing 1 rigidly secured within the car at one side of the rear window 2 of the vehicle. The three semaphores or signals 3, 4 and 5 are mounted in this casing and supported on the pivot 6, as shown, each semaphore having a coiled spring 7 on said pivot to yieldingly hold the semaphore normally in vertical position. Wires 8 lead to the different semaphores, through a tube 9 at one side of the casing 1, and a pull on any wire will raise its allotted semaphore to horizontal position, so that such semaphore will be visible through the rear window of the car, as shown in Fig. 2 of the drawings.

An electric lamp device 10 is disposed immediately above the horizontal position of the semaphores, and in such position that the light from the lamp will be thrown on the rearwardly facing surface of the semaphore when the latter is raised to horizontal position. The lamp can receive its current from any suitable source of power, such as the usual storage battery on motor vehicles.

Each semaphore is adapted to automatically close the circuit through said lamp by engagement of its heel portion 11 with the spring 12, thus pressing this spring against the contact 13 which is connected with the cord or connection 14 running to the lamp, said spring 12 being in turn connected with the cord or connection 15 extending outside and through the tube 9 to the said source of current supply. Obviously, a grounded circuit, or circuit having one side grounded, can be employed for this lamp to facilitate and simplify the circuit connections.

The wires 8 extend forward through the tube 9 to the different buttons or handles or pulls 16, 17 and 18 mounted on the vertical portion 19 of said tube, the latter having slots 20 through which the portions 21 of said handles extend in order to afford connection with their allotted wires. Each slot has an enlarged portion 22 at the lower end thereof to receive the portion 21 of one of the handles or pulls, thereby to frictionally retain the handle or pull in its depressed position, thus holding the allotted semaphore in its raised position. A slight upward pressure on one of the handles or pulls will allow the raised semaphore to swing down by gravity and restore itself to normal or concealed position.

The vertical portion 19 of the tube is preferably supported by a bracket 23 which is adjustable on the fixed bracket 24, the latter being secured by screws 25 to the structure of the vehicle. By reason of the screw and slot connection 26, the bracket 23 can be adjusted or moved about a vertical axis, and held in such adjusted position, thereby to hold the tube portion 19 in convenient position for the operation of the handles or pulls by the driver, the controls thus provided being mounted preferably immediately in front of the steering wheel, on the top structure of a vehicle. By loosening the bolt 27, the bracket 23, which is in the nature of a clamp, will either grip or release the tube portion 19, for the purpose of satisfactory adjustment of the controlling instrumentalities thus provided in front of the driver.

In operation, if the driver is intending to turn to the left, he will pull the proper handle or pull on the tube portion 19, and thus raise the proper semaphore into position to be displayed through the rear window of the car. If he is intending to turn to the right, he will pull another button or handle or pull and raise another semaphore. Similarly, if he is intending to stop, he will pull the third button or handle and display the semaphore which has the word "Stop" thereon. On the right and left semaphores, right and left arrows can be provided to serve as the means for indicating which way the car is going to turn.

It will be seen that the bracket 24 is preferably mounted directly over the windshield 28 of the vehicle, at the left-hand side, directly in front of the steering wheel, whereby the buttons or handles or pulls 16, 17 and 18 are in position to be conveniently operated by the driver.

What I claim as my invention is:

1. In motor vehicle signaling apparatus, the combination of signaling mechanism having a plurality of signals and normally concealed from view at the rear of the car, with a horizontally movable operating connection for the upper end of each signal, and instrumentalities within reach of the driver for controlling said signaling means, said instrumentalities comprising a vertically disposed tubular guide, a plurality of handles movable up and down on said guide, means to adjustably support only the upper end of said guide, leaving its lower end free, each handle being mechanically connected with the horizontally movable operating connection of said signaling means, and each handle being allotted to one of said signals.

2. A structure as specified in claim 1, said signaling mechanism comprising a plurality of pivoted semaphores, a casing for said semaphores, each semaphore forming one of said signals, and each semaphore having a normally concealed position in said casing and a horizontal signaling position, and means for mounting said casing in position whereby it and the semaphores when concealed therein are invisible from the rear.

3. A structure as specified in claim 1, said signaling mechanism being mounted within the top portion of a closed car, at one side of the rear window thereof, in position to display the said signals through the rear window of the car, whereby the window is unobstructed by said signaling mechanism when the signals are all in normal position.

4. A structure as specified in claim 1, said controlling instrumentalities being connected by a tube extending therefrom rearwardly to said signaling mechanism, with a plurality of wires in said tube, and said signaling mechanism comprising a pivoted semaphore allotted to the rear end of each wire, the forward end of each wire being secured to one of said handles.

5. A structure as specified in claim 1, comprising electric illuminating means for said signaling means, associated therewith, and devices whereby said illuminating means are operative automatically by the display of any one of said signals.

6. In motor vehicle signaling apparatus, the combination of movable visual signaling means comprising a plurality of normally vertical signals mounted inside of a closed car, at one side of the rear window thereof, whereby said window is unobstructed by said means when the latter is in normal position, adapted by rising motion of each signal into a more or less horizontal position to display the signal through the rear window of the car, each signal adapted for projection from one side of the window toward the other side thereof, and controlling instrumentalities to selectively operate said signals, said signals forming a unitary device fastened as an attachment to the inside of the car at the side of the window so that normally said device is in sight inside the car but not from the rear through said window.

7. A structure as specified in claim 6, said signaling means comprising a plurality of semaphores normally in concealed position, each semaphore having a visible position through said window.

8. A structure as specified in claim 6, one signal indicating that the vehicle will turn to the right, another signal indicating that the vehicle will turn to the left.

9. A structure as specified in claim 6, one signal indicating that the vehicle will turn to the right, another signal indicating that the vehicle will turn to the left, and a third signal indicating that the car will stop.

10. In automobile signaling apparatus, the combination of a tube disposed in front of the driver, an adjustable bracket supporting said tube, said tube having an upper portion leading rearwardly to the rear of the vehicle, wires in said tube, handles disposed in vertical alinement and slidable up and down on said vertical portions of the tube for operating said wires, and signaling apparatus responsive to the operation of said handles and wires.

11. A structure as specified in claim 10, having means for mounting said bracket directly over the windshield of the car, in front of the steering wheel.

12. A structure as specified in claim 10, said bracket being adjustable about a vertical axis to position the vertical portion of said tube.

13. In signaling apparatus for automobiles, the combination of visual signaling means and a controller for controlling said signaling means, together with connecting said controller with said signaling means, said controller having a support therefor in front of the driver, and said support having adjusting means whereby the controller as a whole is movable into different positions toward and away from the driver to suit the convenience of the driver, and means for retaining the support in any adjusted position of the controller toward or away from the driver.

14. A structure as specified in claim 13, said adjusting means comprising a bracket arm in which the controller is adjustable up and down.

15. A structure as specified in claim 13, said adjusting means comprising a bracket arm which is adjustable about a vertically disposed axis to move the controller laterally.

16. A structure as specified in claim 13, said controller comprising a slotted tube disposed vertically, handles slidable on said slotted tube, said handles connected with said wires.

17. A structure as specified in claim 13, said controller comprising a plurality of handles, each movable back and forth on a straight line.

Specification signed this 24 day of June, 1929.

ANDREW L. WEIS.